United States Patent [19]
Dreyfous

[11] Patent Number: 5,820,381
[45] Date of Patent: Oct. 13, 1998

[54] TEACHING APPARATUS AND METHOD FOR VISUALLY REPRESENTING MATHEMATICAL EXPRESSIONS

[76] Inventor: Ricardo Dreyfous, Condominio Montebello, Apr. J119, Trujillo Alto, Puerto Rico

[21] Appl. No.: 834,597

[22] Filed: Apr. 7, 1997

Related U.S. Application Data

[63] Continuation-in-part of Ser. No. 217,108, Mar. 24, 1994, Pat. No. 5,645,431.

[51] Int. Cl.$^6$ ....................................................... G09B 1/34
[52] U.S. Cl. ............................................. 434/195; 434/191
[58] Field of Search .................................... 434/188, 191, 434/195, 196, 207, 208, 209, 211

[56] References Cited

U.S. PATENT DOCUMENTS

| | | |
|---|---|---|
| 3,208,162 | 9/1965 | Wisdom . |
| 3,423,849 | 1/1969 | Jordan et al. . |
| 3,858,332 | 1/1975 | Rasmussen . |
| 4,332,567 | 6/1982 | Nogues . |
| 4,419,081 | 12/1983 | Steinmann . |
| 4,548,585 | 10/1985 | Kelly . |
| 4,645,461 | 2/1987 | Mortensen . |
| 4,979,749 | 12/1990 | Onanian . |
| 5,645,431 | 7/1997 | Dreyfous ................................ 434/195 |

FOREIGN PATENT DOCUMENTS

| | | |
|---|---|---|
| 1031507 | 6/1953 | France . |
| 20209 | of 1915 | United Kingdom . |
| 1569749 | 6/1980 | United Kingdom . |

OTHER PUBLICATIONS

Picciotto, *The Albegra Lab*, "Creative Publications,"pp. 76–77 (date unknown).

*Primary Examiner*—Jeffrey A. Smith
*Attorney, Agent, or Firm*—Nixon & Vanderhye P.C.

[57] ABSTRACT

An apparatus and method for teaching mathematical expressions includes a plurality of four-sided members that represent the variables of factors of a mathematical expression. Each four-sided member has a different area representing a different variable in the mathematical expression. The apparatus enables a math student to visualize the rules that apply to mathematical expressions. The four-sided members include a first side having a first color and a second side having a second color, different from the first color, wherein the first side represents a positive number, and the second side represents a negative number. Alternatively, the sign may be distinguished by varying surface roughness of the members. The four-sided members can be used for teaching by illustration simple multiplication and division, multiplication, division and factorization of polynomials, linear equations including inequations and absolute value, and systems of linear equations.

4 Claims, 2 Drawing Sheets

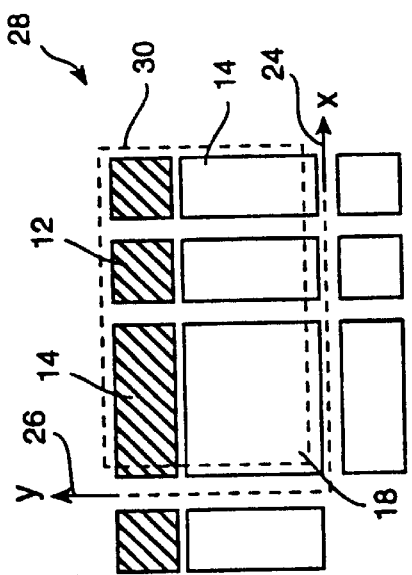
FIG. 2
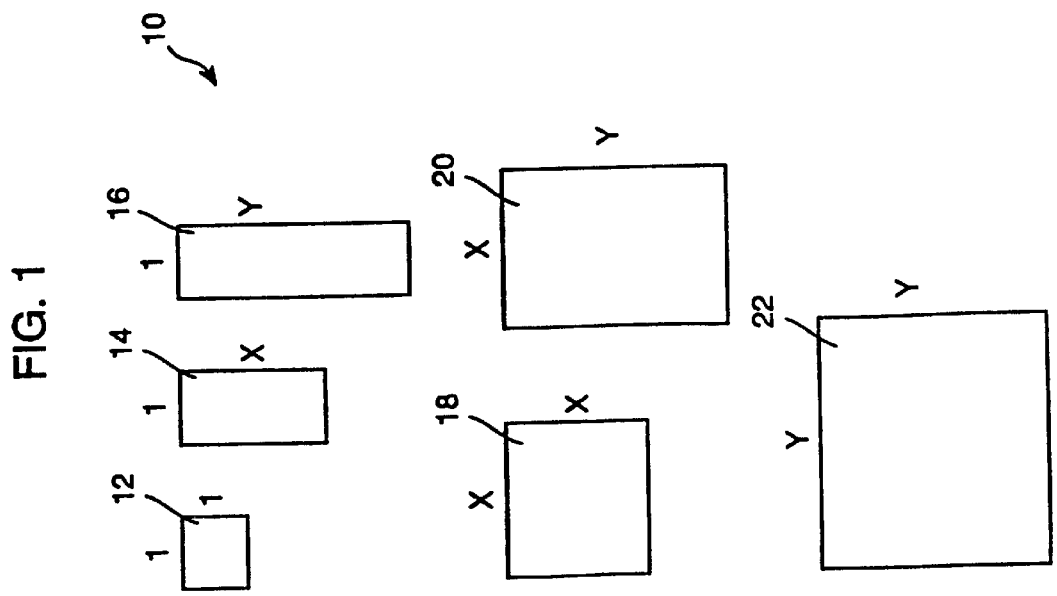
FIG. 3
FIG. 1

TEACHING APPARATUS AND METHOD FOR VISUALLY REPRESENTING MATHEMATICAL EXPRESSIONS

This application is a Continuation-in-part of application Ser. No. 08/217,108 filed Mar. 24, 1994, now U.S. Pat. No. 5,645,431.

BACKGROUND OF THE INVENTION

The present invention is directed to a teaching apparatus and its method of use for demonstrating mathematical expressions, and more particularly, to a teaching apparatus and method that visually represents variables of a mathematical expression and visually represents a simplification of the expression.

A current trend in teaching mathematics is the physical representation of rules and theorems so that students can visualize how the math works without difficult memorization and application of the rules and theorems. Previously disclosed techniques for teaching mathematics allow students to construct the rules themselves through visual derivation using a teaching apparatus.

U.K. Patent No. 20,209 describes a demonstrating apparatus for teaching numbers. The disclosure recognizes that it is desirable for the students to carry out a process demonstrated on a main frame by the teacher. The disclosed apparatus is similar to an abacus.

French Patent No. 1,031,507 describes the use of a plurality of cubes and blocks to teach polynomial expressions.

U.S. Pat. No. 3,858,332 to Rasmussen describes a method and apparatus for demonstrating polynomial algebraic operations. The assembly demonstrates algebraic operations by the manipulation of a plurality of rectangular elements of different sizes and shapes.

U.K. Patent No. 1,569,749 describes a similar block configuration arrangement for teaching polynomial expressions.

U.S. Pat. No. 4,979,749 to Onanian describes a multi-use number board having a series of substantially square raised surfaces or lands arranged in rows and columns on the top surface of the board and separated by an array of substantially perpendicular channels. The board includes holes at the intersections of the channels for receiving a plurality of pegs. In this respect, a string or elastic band may be stretched about the pegs for the formation of various shapes or figures or for use as a geoboard.

U.S. Pat. No. 4,645,461 to Mortensen describes a method for structurally differentiating polynomial functions using parallelogramic elements. The methods include representing a first ordered pair defined by the polynomial function as a construction of such structural elements.

U.S. Pat. No. 4,332,567 to Nogues describes a mathematical teaching apparatus formed by a cubic block array comprising a plurality of different size blocks arranged in rows and columns. The cubic block array has a base array of 10×10 blocks commencing with a 1 cm block and progressing in X and Y rows with increasing length blocks and overlying arrays of the same pattern but progressively increasing in height. The blocks are used to demonstrate multiplication, addition and subtraction as well as cubing and elementary algebra.

The devices described above are generally expensive to manufacture, include too many small parts, are difficult to comprehend, and are not effective as a teaching tool. Accordingly, there is a need for a simple and effective teaching apparatus for representing mathematical expressions that helps to develop the necessary skills for learning math.

SUMMARY OF THE INVENTION

It is therefore an object of the present invention to provide a teaching apparatus and method for representing mathematical expressions that overcomes the problems of the existing devices.

It is another object of the invention to provide a teaching apparatus that is simple and inexpensive to manufacture while effectively assisting students in visualizing the rules and theorems for solving and working with mathematical expressions.

It is yet another object of the invention to provide a method of using a teaching apparatus for representing mathematical expressions that is effective and easy to understand by beginning, intermediate, and college-level math students.

These and other objects and advantages of the invention are achieved by providing a teaching apparatus and method for visually representing mathematical expressions, the apparatus including a first plurality of four-sided members, at least two sides of the members being equal in length. An area of each of the first plurality of four-sided members represents a variable in a mathematical expression A first factor of the mathematical expression has at least one variable represented by a first set of four-sided members of the first plurality of members, and a second factor of the mathematical expression has at least one variable represented by a second set of four-sided members of the first plurality of four-sided members. Each of the first plurality of four-sided members has structure for distinguishing whether the variable is positive or negative.

The apparatus is further provided with a second plurality of four-sided members representing operators for use with the first plurality of four-sided members.

In accordance with another aspect of the present invention, there is provided a method of visually representing mathematical expressions using the apparatus of the invention. The method includes the steps of representing a variable in a mathematical expression with an area of each of the plurality of four-sided members, representing a first factor of the mathematical expression with a first set of four-sided members of the plurality of four-sided members, representing a second factor of the mathematical expression with a second set of four-sided members of the plurality of members, wherein the first and second sets each comprise at least one four-sided member of the plurality of four-sided members, and representing at least one operator of the mathematical expression with a third set of four-sided members of the plurality of members.

BRIEF DESCRIPTION OF THE DRAWINGS

These and other aspects and advantages of the present invention will become apparent from the following detailed description of preferred embodiments when taken in conjunction with the accompanying drawings, in which:

FIG. 1 illustrates examples of the four-sided members of the invention;

FIG. 2 represents a multiplication or division operation in accordance with the invention;

FIG. 3 shows the teaching apparatus of the invention for teaching polynomial equations;

DETAILED DESCRIPTION OF PREFERRED EMBODIMENTS

Figure 4:
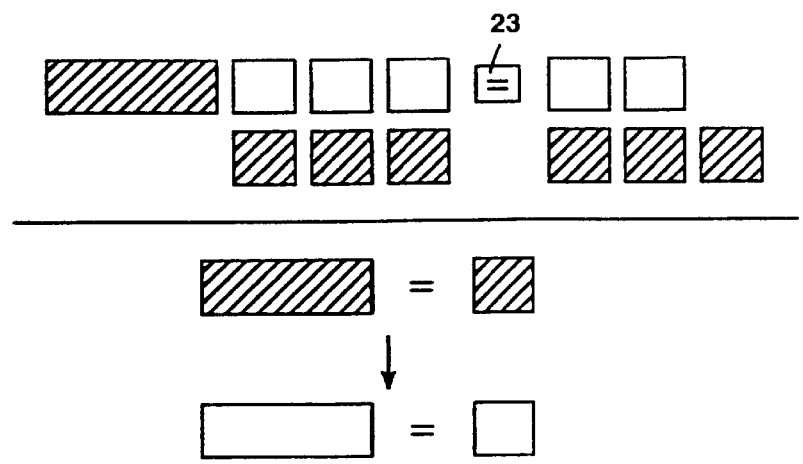
FIG. 4 shows the invention for teaching the solving of algebraic equations and in equations.

The invention and the teaching concept will now be described in conjunction with a preferred embodiment Those of ordinary skill in the art will contemplate alternatives and equivalents that fall within the scope of the invention, and the description is not meant to be limiting.

Referring to FIG. 1, the present invention includes a plurality of four-sided members 10. The area of each member represents a variable in a mathematical expression. The length of each side of the four-side member (rectangle or square) is representative of either a unit "n" (n=1, 2, 3, ... , n), or variables "X" and "Y." The area of member 12 is the product of the length of the sides, or 1×1=1. Similarly, the area of members 14 and 16 equal X and Y, respectively. The areas of members 18 and 20 equal $X^2$ and XY, respectively, and the area of member 22 equals $Y^2$. Additional members 23 represent operators (=, <, $\leq$, >, $\geq$) for use with the various teaching methods described below.

Members 10 can be formed of any material suitable for the described purpose that will maintain its shape and is easy to handle. For example, paper, cardboard, plastic, or wood are suitable materials. Members 10 could also be displayed on a computer screen. Opposite sides of members 10 contain different colors, indicating whether the represented variable is positive or negative. Alternatively, the members 10 could be manufactured with varying surface roughness for indicating whether the represented variable is positive or negative, for example, smooth surface for positive, and rough or raised surface for negative. In the embodiment illustrated, negative variables are indicated by cross hatching, and positive variables are white.

Using the plurality of four-sided members 10, various mathematical expressions can be visually represented to facilitate a math student's learning and understanding of the expression. These include multiplication, division, multiplication of polynomials, division of polynomials, factorization of polynomials, algebraic equations, inequations and absolute value, and systems of linear equations. By representing the variables of the mathematical expressions using members 10, students can visualize the structure of the mathematical expression, thereby enabling them to formulate their own rules and better understand the mathematical concepts. The present invention is not an apparatus for solving mathematical expressions, but rather, is an apparatus for assisting the learning and teaching of mathematical expressions.

The teaching concept of the arrangement will now be described in conjunction with FIGS. 2–5. Referring to FIG. 2, simple multiplication (i.e., multiplication without unknown variables) is illustrated. The mathematical expression illustrated in FIG. 2 is (−2) (+3)=−6. In a preferred embodiment, the sign (+/−) of the second factor (+3) indicates the initial arrangement of the members. In this example, students visualize two groups of three members on their positive side (illustrated white), as shown in the left side portion of FIG. 2. The sign (+/−) of the first factor (−2) indicates whether the grouped members should be reversed from their initial configuration. In FIG. 2, because the sign of the first factor is negative, the grouped members are reversed so that the negative side (illustrated cross hatched) is showing, as shown in the right side portion of FIG. 2. In a similar manner, if the expression is (−2) (−3)=6, the initial configuration of the two groups of three members has the negative side showing because the second factor (−3) of the expression is negative. As above, the final configuration is reversed so that the positive side is showing because the first factor is also negative.

Simple division can be illustrated in a manner similar to the simple multiplication discussed above. The numerator in the expression determines how many members to begin with, and the denominator indicates how many groups the members are to be divided in. Referring to FIG. 2, to illustrate (−6)/(+2), six members are to be divided into two groups. The members are initially configured in accordance with the sign of the denominator (+2), and after being divided into groups, the members are reversed because the numerator (−6) is negative.

FIG. 3 illustrates the use of members 10 for teaching polynomial expressions. Using the base expression (X−1) (X+2)=$X^2$+X−2, a first factor (X−1) is represented along a Y-axis 26 of a grid 28 using one "X" member 14 and one "−1" member 12, and a second factor (X+2) is represented along an X-axis 24 of grid 28 using one "X" member 14 and two "+1" members 12. The product of each variable in the expression is represented in the area 30 defined by the first and second factors. Additional members 10 corresponding to the area 30 defined by the factors of the polynomial expression are placed in the first quadrant of grid 28 and represent the product of the factors of the polynomial expression. Negative member 14 cancels one of the two positive members 14, and the resulting product is represented by one member 18, one member 14, and two members 12, or $X^2$+X−2. Using related configurations, the invention can also be used for teaching division and factorization of polynomials.

In an alternative embodiment, a pair of elongated members slidably disposed in two dimensions and perpendicular to one another (not pictured) represent the illustrated X-axis and Y axis. The elongated members facilitate the construction of the polynomial expression using members 10 of the invention.

Referring to FIG. 4, the teaching apparatus is illustrated for teaching algebraic expressions. Using the base equation −X+3 =2, each variable is represented on respective sides of an equal sign (=) 23. In order to isolate the "X, " members 10 representing (−3) are added to each side of the expression. After cancelling positives and negatives, the resulting members represent −X=1. To illustrate the solution of the expressions, each side is multiplied by (−1) by reversing the resulting members so that the positive side is showing. In a similar manner, inequations and absolute value equations can be represented, replacing the equal sign with an appropriate sign (<, $\leq$,>, $\geq$) 23 or absolute value symbol (|X+ 3|=2), respectively.

Figure 5:
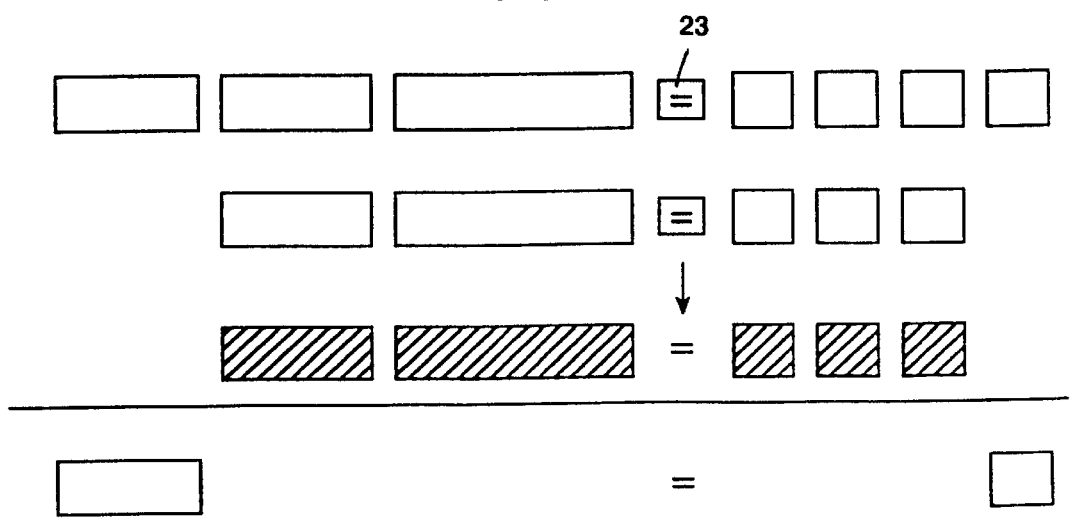
FIG. 5 illustrates the invention for teaching systems of linear equations.

FIG. 5 illustrates the apparatus of the present invention for teaching systems of linear equations. An example system of linear equations for illustrating the teaching concept of the invention is as follows:

2X+Y=4

X+Y=3

In order to isolate one of the unknown variables in the expression, the second expression (X+Y=3) is multiplied by (−1) by reversing the members so that the negative side is showing. Similar to that discussed above, after cancelling positives and negatives, the resulting members represent X=1, thereby representing the solution to the system of linear equations.

Members 10 can include any number of different width sides, representing additional variables such as "Z." In this respect, additional members 10 are necessary for each possible combination of n, X, Y and Z, etc.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A teaching apparatus for visually representing mathematical expressions, the apparatus comprising:

a first plurality of four-sided members, at least two sides of said members being equal in length, wherein an area of each of said first plurality of four-sided members represents a variable in a mathematical expression, a first factor of said mathematical expression having at least one variable represented by a first set of four-sided members of said first plurality of members, and a second factor of said mathematical expression having at least one variable represented by a second set of four-sided members of said first plurality of members, wherein said first and second sets each comprises at least one four-sided member of said first plurality of four-sided members, each of said first plurality of four-sided members comprising structure that distinguishes whether said variable is positive or negative; and a second plurality of four-sided members representing operators for use with said first plurality of four-sided members.

2. A teaching apparatus according to claim 1, wherein said structure that distinguishes whether said variable is positive or negative comprises varying surface roughness.

3. A teaching apparatus according to claim 1, wherein each of said first plurality of said four-sided members is capable of being positive and negative.

4. A method of visually representing mathematical expressions using a plurality of four-sided members, at least two sides of said members being equal in length, the method comprising the steps of:

representing a variable in a mathematical expression with an area of each of said plurality of four-sided members;

representing a first factor of said mathematical expression with a first set of four-sided members of said plurality of four-sided members;

representing a second factor of said mathematical expression with a second set of four-sided members of said plurality of members, wherein said first and second sets each comprise at least one four-sided member of said plurality of four-sided members;

enabling each of said plurality of four-sided members to distinguish whether said variable is positive or negative by varying a surface roughness of said plurality of four-sided members; and representing at least one operator of said mathematical expression with a third set of four-sided members of said plurality of members.

* * * * *